(12) United States Patent
Tsutsumi

(10) Patent No.: US 7,006,812 B2
(45) Date of Patent: Feb. 28, 2006

(54) INTERMEDIATE FREQUENCY STAGE AND SIGNAL PROCESSOR USED IN DIGITAL PORTABLE TELEPHONE APPARATUS

(75) Inventor: Shinichi Tsutsumi, Kanagawa (JP)

(73) Assignee: Sony Corporation, (JP)

( * ) Notice: Subject to any disclaimer, the term of this patent is extended or adjusted under 35 U.S.C. 154(b) by 600 days.

(21) Appl. No.: 09/931,485

(22) Filed: Aug. 17, 2001

(65) Prior Publication Data

US 2002/0034933 A1  Mar. 21, 2002

(30) Foreign Application Priority Data

Aug. 22, 2000 (JP) ............................ P2000-250722

(51) Int. Cl.
*H04Q 7/20* (2006.01)
(52) U.S. Cl. ...................... 455/323; 455/313; 455/334
(58) Field of Classification Search .......... 342/357.09, 342/118, 357.1; 375/261; 370/335, 342; 455/73, 575
See application file for complete search history.

(56) References Cited

U.S. PATENT DOCUMENTS

| | | | | |
|---|---|---|---|---|
| 6,094,564 A | * | 7/2000 | Tomiya et al. | ................ 455/73 |
| 6,097,974 A | * | 8/2000 | Camp, Jr. et al. | ........... 455/575 |
| 6,107,960 A | * | 8/2000 | Krasner | ................. 342/357.09 |
| 6,150,980 A | * | 11/2000 | Krasner | ................... 342/357.1 |
| 6,236,352 B1 | * | 5/2001 | Walmsley | .................... 342/118 |
| 6,240,142 B1 | * | 5/2001 | Kaufman et al. | ........... 375/261 |
| 6,839,334 B1 | * | 1/2005 | Krishnamoorthy et al. | . 370/335 |
| 2003/0048834 A1 | * | 3/2003 | Feher | ......................... 375/219 |
| 2003/0128680 A1 | * | 7/2003 | Odenwalder et al. | ....... 370/335 |

FOREIGN PATENT DOCUMENTS

| | | |
|---|---|---|
| JP | 07-312783 | 11/1995 |
| JP | 08-023577 | 1/1996 |

OTHER PUBLICATIONS

K. Boehm et al, 'An IF Digitizing Receiver for a Combined GPS/GSM Terminal', 1998, RAWCOM Proceedings '98 in IEEExplore, pp. 39-42.*

* cited by examiner

*Primary Examiner*—Fan Tsang
*Assistant Examiner*—Lisa Hashem
(74) *Attorney, Agent, or Firm*—Rader, Fishman & Grauer, PLLC; Ronald P. Kananen

(57) ABSTRACT

A signal processing circuit in a digital portable telephone apparatus having a GPS function has a phase shifter for making an I signal and a Q signal obtained by demodulating a BPSK modulated signal coincide with each other in phase and an adder for combining both the signals (I and Q signals) after the phase coincidence with each other. Therefore, a receiving IF stage normally used in a portable telephone apparatus is used also as an IF stage for a GPS receiving system.

7 Claims, 5 Drawing Sheets

INTERMEDIATE FREQUENCY STAGE AND SIGNAL PROCESSOR USED IN DIGITAL PORTABLE TELEPHONE APPARATUS

BACKGROUND OF THE INVENTION

The present invention relates to a semiconductor apparatus and a portable terminal apparatus, and particularly to a semiconductor apparatus including a quadrature demodulator and a portable terminal apparatus using the semiconductor apparatus.

Digital portable telephone apparatus using such systems as CDMA (Code Division Multiple Access), GSM (Global System for Mobile Communications), and PDC (Personal Digital Cellular) have recently been spreading rapidly as portable terminal apparatus. Also, development is proceeding to provide a portable terminal apparatus typified by the digital portable telephone apparatus with a GPS (Global Positioning System) function.

When the portable terminal apparatus is provided with the GPS function, the portable terminal apparatus may simply include the function of a conventional GPS receiver as it is. However, this results in a complex configuration as well as a large apparatus body and high cost of the portable terminal apparatus. Therefore, it is conceivable that the configuration of the portable terminal apparatus may be simplified by using part of circuits in a signal processing system of the portable terminal apparatus also for GPS reception.

The receiving and demodulating part of the portable terminal apparatus, for example a digital portable telephone apparatus uses a linear amplifier and a quadrature demodulator (see Japanese Patent No. 3003839, for example). On the other hand, a GPS receiver uses a nonlinear amplifier and a digital signal processing circuit to demodulate a received signal (see Japanese Patent Laid-open No. Hei 8-23577, for example).

When the sharing of circuits by the receiving system of the digital portable telephone apparatus and the GPS receiving system is considered, it is desired to share a section from a baseband amplifier to an input of a digital signal processing circuit. However, the digital portable telephone apparatus handles a quadrature modulated signal, whereas GPS handles a BPSK (Binary Phase Shift Keying) modulated signal. Accordingly, the digital portable telephone apparatus and GPS use different demodulators and different signal level diagrams, and therefore some measures are required on the GPS receiving side.

More specifically, when a BPSK modulated signal of GPS is to be demodulated by a quadrature demodulator, a conventional IQ interface system requires that the BPSK modulated signal of GPS also maintain linearity and a dedicated bitmap logic circuit be provided. Therefore, a complex control system is required, thereby limiting reduction in power consumption and decreasing the degree of freedom of design of blocks to be used in conjunction with the receiving system of the portable telephone apparatus.

SUMMARY OF THE INVENTION

In order to solve the above problems, the present invention provides the following compositions. According to the present invention, there is provided a semiconductor apparatus comprising a plurality of input terminals for taking in intermediate-frequency signals from a plurality of systems, a variable gain amplifier for amplifying the intermediate-frequency signals inputted via the input terminals and a quadrature demodulator for subjecting the intermediate-frequency signals that have been passed through the variable gain amplifier to quadrature demodulation for output.

The thus formed semiconductor apparatus is used as an IF stage of a portable terminal apparatus capable of receiving a quadrature modulated signal when the portable terminal apparatus is to be provided with a function of receiving a BPSK modulated signal. An IF signal (intermediate-frequency signal) from a first receiving system for receiving a quadrature modulated signal and an IF signal from a second receiving system comprising at least one system for receiving a BPSK modulated signal are inputted to the IF stage via the plurality of input terminals on reception. Both the IF signals are processed by the common IF stage.

Thus, the IF stage is shared for the system for receiving a quadrature modulated signal and the system for receiving a BPSK modulated signal. In this case, the IF stage does not necessarily need to be provided with both the variable gain amplifier and the quadrature demodulator; the IF stage may be provided with only one of them. Even in this case, part of the IF stage circuit can be shared for the system for receiving a quadrature modulated signal and the system for receiving a BPSK modulated signal.

The above and other objects, features and advantages of the present invention will become apparent from the following description and the appended claims, taken in conjunction with the accompanying drawings in which like parts or elements denoted by like reference symbols.

DETAILED DESCRIPTION OF PREFERRED EMBODIMENTS

Preferred embodiments of the present invention will hereinafter be described in detail with reference to the drawings.

<First Embodiment>

Figure 1:
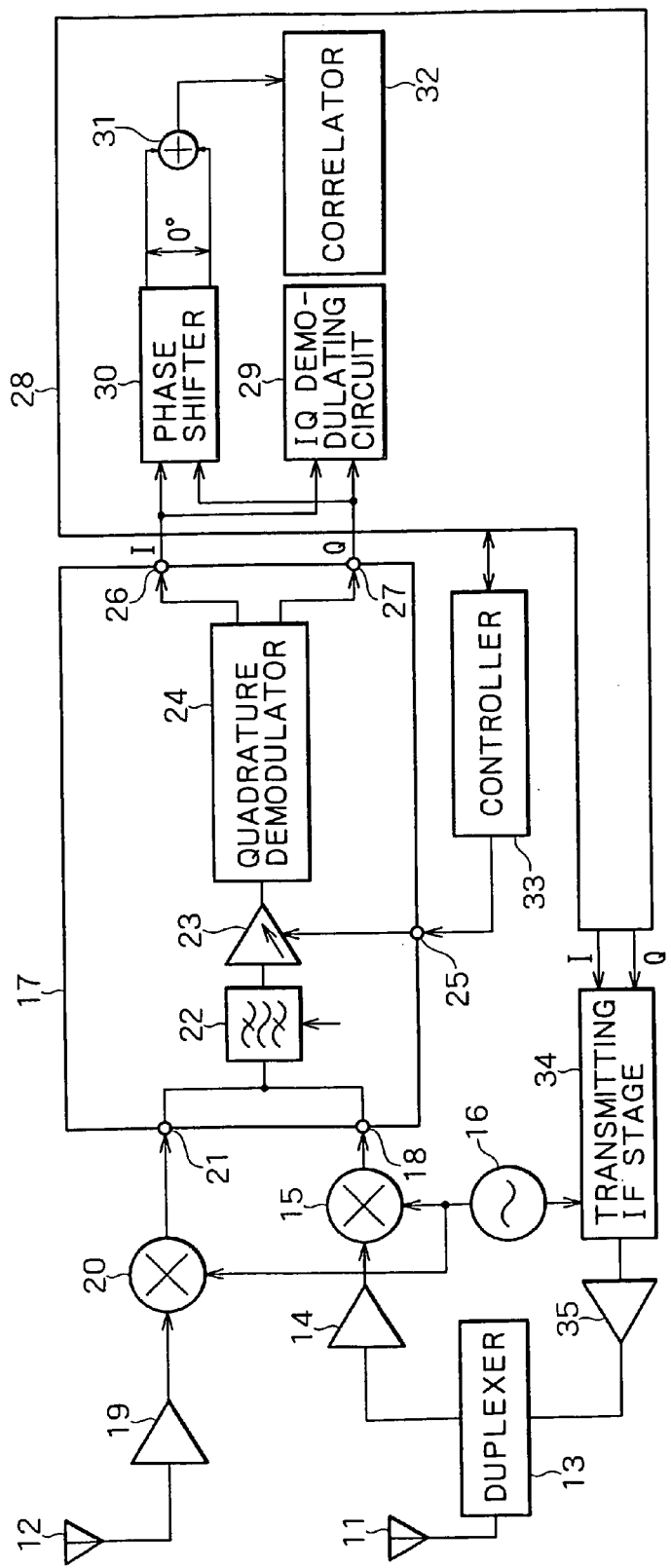
FIG. 1 is a block diagram showing a configuration of a digital portable telephone apparatus according to a first embodiment of the present invention.

FIG. 1 is a block diagram showing a configuration of a portable terminal apparatus, for example a digital portable telephone apparatus according to a first embodiment of the present invention. The digital portable telephone apparatus according to the first embodiment of the present invention has a GPS function, for example, using a BPSK modulated signal.

The apparatus in FIG. 1 has two antennas: an antenna 11 for the portable telephone and an antenna 12 for GPS. An input/output terminal of the portable telephone antenna 11 is connected to an input/output terminal of a duplexer 13 for switching between transmission and reception. A band allocation filter or a selector switch is used as the duplexer 13. An output terminal of the duplexer 13 is connected to an input terminal of a receiving amplifier 14. An output terminal of the receiving amplifier 14 is connected to one input terminal of a mixer 15.

The mixer 15 mixes a high-frequency signal (quadrature modulated signal), which is received by the antenna 11, passed through the duplexer 13 and the receiving amplifier 14, and then inputted to the one input terminal of the mixer 15, with a local oscillation frequency supplied from a local oscillator 16 to the other input terminal of the mixer 15, thereby converting the high-frequency signal into an IF signal (intermediate-frequency signal). The duplexer 13, the receiving amplifier 14, the mixer 15, and the local oscillator 16 comprise a receiving system (front end) on the portable telephone side. An output terminal of the mixer 15 is connected to a first input terminal 18 of a receiving IF stage 17.

On the other hand, an output terminal of the GPS antenna 12 is connected to an input terminal of a receiving amplifier 19. An output terminal of the receiving amplifier 19 is connected to one input terminal of a mixer 20. The mixer 20 mixes a high-frequency signal (BPSK modulated signal), which is received by the antenna 12, passed through the receiving amplifier 19, and then inputted to the one input terminal of the mixer 20, with the local oscillation frequency supplied from the local oscillator 16 to the other input terminal of the mixer 20, thereby converting the high-frequency signal into an IF signal. The receiving amplifier 19, the mixer 20, and the local oscillator 16 comprise a receiving system (front end) on the GPS side. An output terminal of the mixer 20 is connected to a second input terminal 21 of the receiving IF stage 17.

The receiving IF stage 17 incorporates a band-pass filter 22, a variable gain amplifier 23, and a quadrature demodulator 24, for example, which are integrated into an IC. The receiving IF stage 17 corresponds to the semiconductor apparatus according to the present invention. The band-pass filter 22 has a necessary limiting bandwidth electronically varied to coincide with bandwidths during portable telephone reception and during GPS reception. Of course, band-pass filters 22 may be provided individually for the portable telephone and for GPS. The band-pass filter 22 may also be disposed externally to the IC.

In addition to the two input terminals 18 and 21, the receiving IF stage 17 has a control input terminal 25 for taking in a control signal for controlling a gain of the variable gain amplifier 23, and two output terminals 26 and 27 for outputting an I signal (in-phase signal) and a Q signal (quadrature signal), respectively, obtained by quadrature demodulation by the quadrature demodulator 24.

An input terminal of the band-pass filter 22 in the receiving IF stage 17 is connected to the two input terminals 18 and 21. An output terminal of the band-pass filter 22 is connected to an input terminal of the variable gain amplifier 23. An output terminal of the variable gain amplifier 23 is connected to an input terminal of the quadrature demodulator 24. A gain control terminal of the variable gain amplifier 23 is connected to the control input terminal 25. An I output terminal and a Q output terminal of the quadrature demodulator 24 are connected to the output terminals 26 and 27, respectively.

Figure 2:
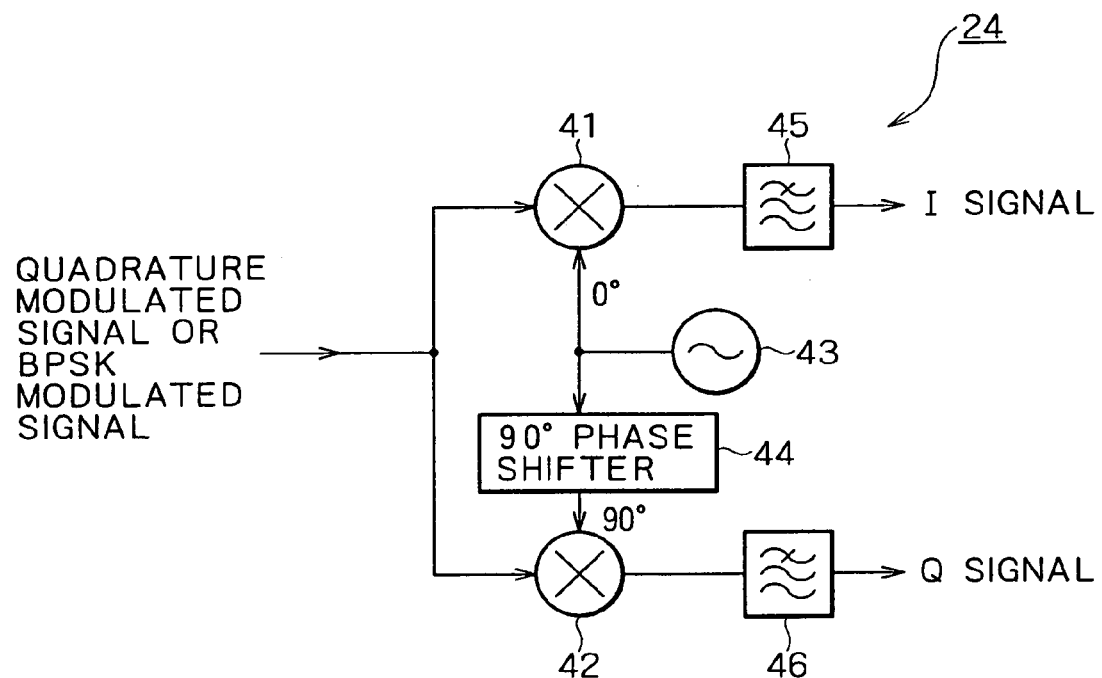
FIG. 2 is a block diagram showing a concrete configuration of a quadrature demodulator.

FIG. 2 shows a concrete configuration of the quadrature demodulator 24. The quadrature demodulator 24 has a known configuration with two multipliers 41 and 42, a signal source 43, a 90° phase shifter 44, and two low-pass filters 45 and 46.

A quadrature modulated signal supplied from the receiving system on the portable telephone side or a BPSK modulated signal supplied from the receiving system on the GPS side is inputted to one input terminal of the multiplier 41 and one input terminal of the multiplier 42 in the quadrature demodulator 24. The multiplier 41 multiplies the quadrature modulated signal or the BPSK modulated signal by a signal directly supplied from the signal source 43 to the other input terminal of the multiplier 41. The multiplication output of the multiplier 41 is passed through the low-pass filter 45 having a necessary limiting bandwidth, and then derived as an I signal.

The other input terminal of the multiplier 42 is supplied with a signal that is outputted from the signal source 43 and shifted in phase by 90° by the 90° phase shifter 44. The multiplier 42 multiplies the quadrature modulated signal or the BPSK modulated signal by the signal that is shifted in phase by 90°. The multiplication output of the multiplier 42 is passed through the low-pass filter 46 having a necessary limiting bandwidth, and then derived as a Q signal.

The necessary limiting bandwidth of the low-pass filters 45 and 46 is electronically varied in a correspondence with that of the band-pass filter 22 in FIG. 1 to coincide with bandwidths during portable telephone reception and during GPS reception. Of course, low-pass filters 45 and 46 may also be provided individually for the portable telephone and for GPS.

Returning to FIG. 1, the I signal and the Q signal outputted from the receiving IF stage 17 are supplied to a signal processing circuit (DSP) 28. The signal processing circuit 28 is a baseband IC, and has an IQ demodulating circuit 29 for the portable telephone system and a phase shifter 30, an adder 31, and a correlator 32 for the GPS system. The signal processing circuit 28 is controlled by a controller 33.

The controller 33 includes a CPU and a memory, and controls parts of the apparatus by software on the basis of instructions from a base station and the user. As part of the control, the controller 33 controls the gain of the variable gain amplifier 23 on the basis of a demodulated signal. Since radio waves of the portable telephone have a wide dynamic range from weak radio waves to strong radio waves (especially near a base station), the controller 33 controls the gain of the variable gain amplifier 23 according to level of the demodulated signal, which is AGC (Automatic Gain Control), during operation of the portable telephone.

On the other hand, linearity of the BPSK modulated signal is not considered during GPS reception, that is, when the BPSK modulated signal is demodulated, and therefore as an example, the gain of the variable gain amplifier 23 is fixed at about a maximum gain. Incidentally, the apparatus may employ a configuration for controlling the gain to an appropriate lower level when a strong interfering wave is inputted. In addition, the gain of the variable gain amplifier 23 may be controlled to a maximum gain while maintaining linearity on the basis of the demodulated signal, or controlled to about the maximum gain even with nonlinearity.

The I signal and the Q signal outputted from the signal processing circuit 28 are supplied to a transmitting IF stage 34 in a transmission system. The transmitting IF stage 34 includes a quadrature modulator and a mixer. The transmitting IF stage 34 subjects the I signal and the Q signal supplied from the signal processing circuit 28 to quadrature modulation, converts the quadrature modulated signal into a high-frequency signal, and then outputs the high-frequency signal. The high-frequency signal is amplified by a transmitting amplifier (power amplifier) 35, and then supplied to the antenna 11 via the duplexer 13.

Description will next be made of operations of the signal processing circuit 28 in the thus formed digital portable telephone apparatus having the GPS function during portable telephone operation and during GPS reception.

During portable telephone operation, the IQ demodulating circuit 29 in the signal processing circuit 28 performs signal processing to demodulate the I signal and the Q signal obtained by quadrature demodulation of the quadrature modulated signal by the IF stage 17 using a QPSK (Quadrature Phase Shift Keying) bitmap.

During GPS reception, on the other hand, the phase shifter 30 restores the phase relation of the I signal and the Q signal obtained by quadrature demodulation of the BPSK modulated signal by the IF stage 17 and having a phase difference of 90° to original relation to thereby make the I signal and the Q signal in phase with each other. Then, the adder 31 combines the I signal and the Q signal with each other, and then supplies the result to the correlator 32. The correlator 32 is intended to demodulate the BPSK modulated signal.

Figure 3:
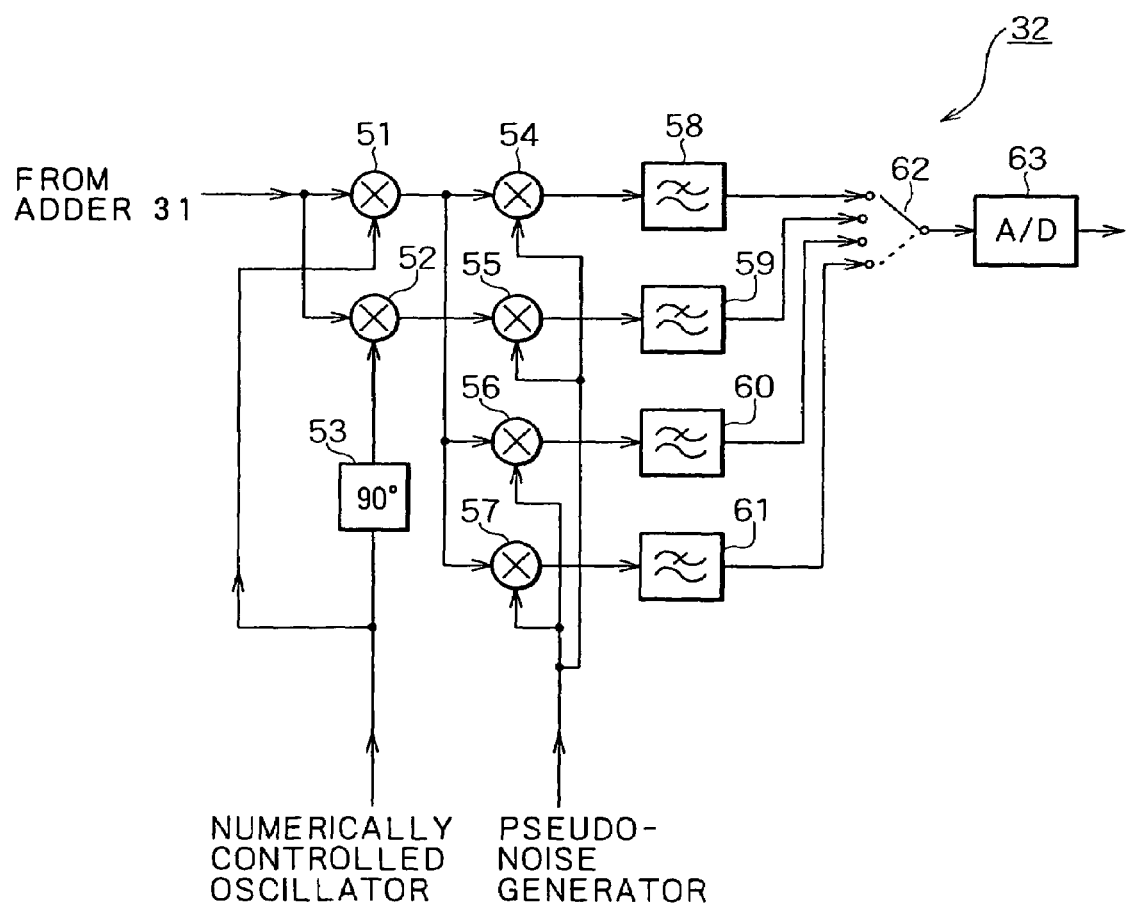
FIG. 3 is a block diagram showing a concrete configuration of a correlator.

A concrete configuration of the correlator 32 is shown in FIG. 3. As is clear from FIG. 3, the correlator 32 comprises two multipliers 51 and 52, a 90° phase shifter 53, four mixers 54 to 57, four low-pass filters 58 to 61, a scanning switch 62, and an A/D converter 63.

A quadrature modulator comprising the multipliers 51 and 52 and the 90° phase shifter 53 in the thus comprised correlator 32 subjects the signal resulting from addition of the I and Q signals supplied from the adder 31 in FIG. 1 to quadrature modulation using a carrier wave supplied from a numerically controlled oscillator (not shown). Thus, a component in phase with the carrier wave of the received signal is derived as output of the multiplier 51, while a quadrature component 90° out of phase with the carrier wave of the received signal is derived as output of the multiplier 52.

The in-phase component derived as output of the multiplier 51 serves as one input to the mixers 54, 56, and 57. As the other input to the mixers 54, 56, and 57, a gold code generated by a pseudo-noise generator (not shown) for despreading a spread spectrum signal from a satellite is supplied. The mixers 54, 56, and 57 determine correlations of the phase of the in-phase component with a central phase, a slightly advanced phase, and a slightly delayed phase of the gold code, and thereby detect reception of sent data and the advance and delay of the gold code.

On the other hand, the quadrature component derived as output of the multiplier 52 serves as one input to the mixer 55. As the other input to the mixer 55, the gold code generated by the pseudo-noise generator is supplied. The mixer 55 determines a correlation of the phase of the quadrature component with the central phase of the gold code, and thereby determines a phase difference between the received signal and the carrier wave outputted by the numerically controlled oscillator. On the basis of the phase difference, frequency of the numerically controlled oscillator is controlled. outputs of the mixers 54 to 57 are passed through the low-pass filters 58 to 61, respectively, and then supplied to the scanning switch 62. The scanning switch 62 sequentially scans the outputs of the mixers 54 to 57 inputted via the low-pass filters 58 to 61, respectively, to supply to the A/D converter 63. The A/D converter 63 converts the analog signals sequentially inputted thereto into a digital signal, and then outputs the digital signal.

As described above, the digital portable telephone apparatus having the GPS function is provided with the phase shifter 30 for making the I signal and the Q signal obtained by demodulating the BPSK modulated signal coincide with each other in phase and the adder 31 for combining the I signal and the Q signal after the phase coincidence with each other. Therefore, the receiving IF stage 17 normally used in a portable telephone apparatus can be used also as the IF stage for the GPS receiving system without employing a complex control system.

In addition, when a conventional digital portable telephone apparatus is made to have the GPS function, signal processing frequency needs to fall into a baseband. However, according to the foregoing configuration of the digital portable telephone apparatus according to the first embodiment, interface frequency to the signal processing circuit 28 does not need to be considered in principle. Therefore, the digital portable telephone apparatus according to the first embodiment has another advantage of increasing the degree of freedom of frequency allocation in radio parts from the antennas 11 and 12 to the receiving IF stage 17.

It is to be noted that while in the above embodiment, the band-pass filter 22, the variable gain amplifier 23, and the quadrature demodulator 24 in the receiving IF stage 17 are for common use, the above embodiment is not limited to this, and at least one of the band-pass filter 22, the variable gain amplifier 23, and the quadrature demodulator 24 may be configured for common use.

In addition, in the above embodiment, the receiving IF stage 17, or the semiconductor apparatus according to the present invention, has the two input terminals 18 and 21, and one input terminal 21 is used as the input terminal for GPS. However, the input terminals may be further increased in number to enable input of BPSK modulated signals other than that of GPS and thus allow common use of the receiving IF stage 17 for a plurality of receiving systems.

<Second Embodiment>

Figure 4:
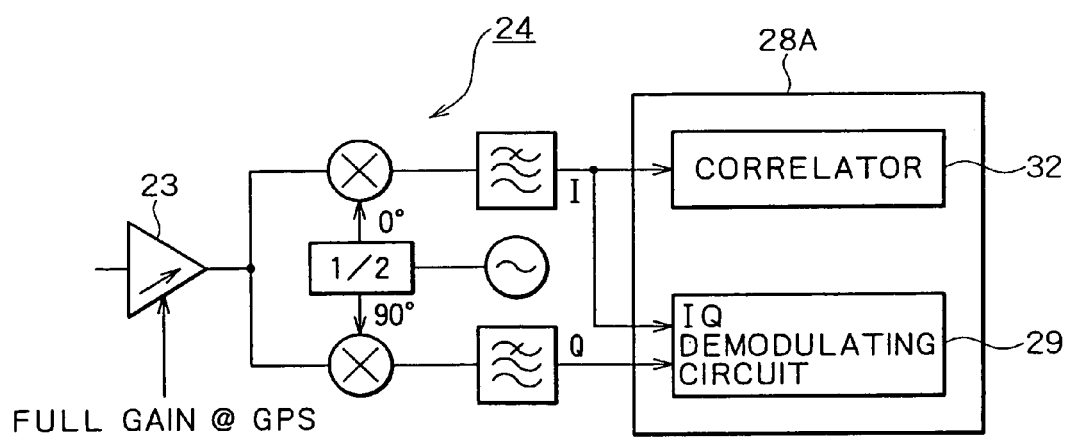
FIG. 4 is a block diagram showing a configuration of main parts of a digital portable telephone apparatus according to a second embodiment of the present invention.

FIG. 4 is a block diagram showing a configuration of main parts of a digital portable telephone apparatus according to a second embodiment of the present invention. In FIG. 4, a variable gain amplifier 23, a quadrature demodulator 24, and a signal processing circuit 28A are shown as the main parts.

The signal processing circuit 28A according to the second embodiment uses only one of an I signal and a Q signal, only the I signal in this case, supplied from the receiving IF stage 17 for demodulation of a BPSK modulated signal in a GPS receiving system. The I signal is supplied directly to a correlator 32 for demodulation. It is clear also from arrangement of the correlator 32 shown in FIG. 3 that the demodulation can be performed on the basis of only one of the I signal and the Q signal.

Thus, although as compared with the first embodiment, the second embodiment does not add both signals (I and Q signals) together and therefore its sensitivity is correspondingly somewhat lowered, the use of only one of the I signal and the Q signal to demodulate the BPSK modulated signal eliminates the need for employing a phase shifter 30 and an adder 31. Therefore, it is possible to simplify circuit configuration and further reduce power consumption.

<Third Embodiment>

Figure 5:
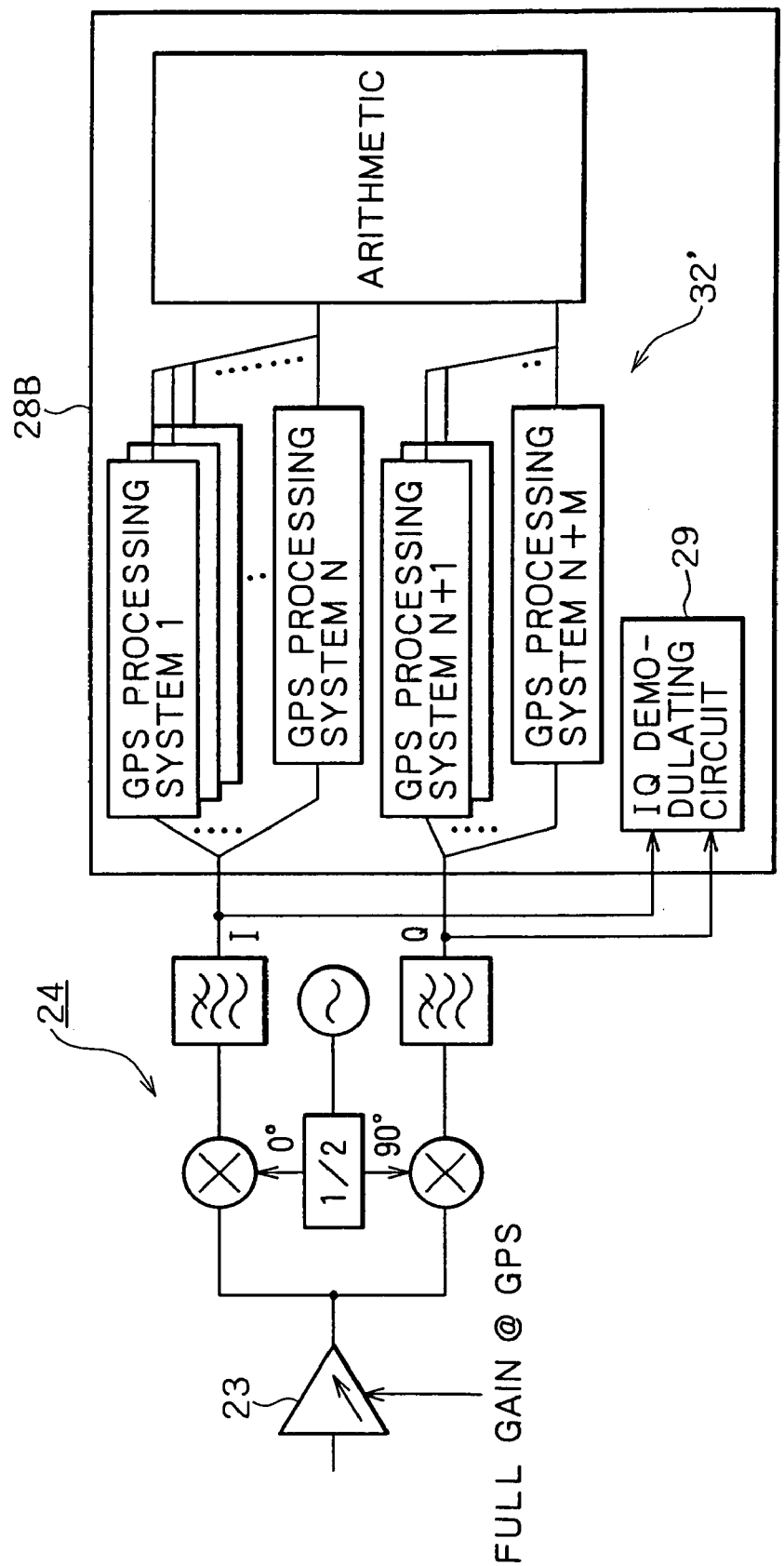
FIG. 5 is a block diagram showing a configuration of main parts of a digital portable telephone apparatus according to a third embodiment of the present invention.

FIG. 5 is a block diagram showing a configuration of main parts of a digital portable telephone apparatus according to a third embodiment of the present invention. Also in FIG. 5, a variable gain amplifier 23, a quadrature demodulator 24, and a signal processing circuit 28B are shown as the main parts. As is clear from configuration of a correlator 32' shown in FIG. 5, there are two phase shifters for advance and delay within the correlator 32'. The third embodiment has been made by directing attention to a configuration for determining correlation between outputs of the phase shifters and a 0° phase signal output.

Specifically, for a GPS receiving system, the signal processing circuit 28B uses an I signal outputted from a quadrature demodulator 24 for normal signal processing and uses a Q signal as it is as a comparison signal for determining correlation. When components of the correlator 32' shown in FIG. 5 are compared with components in FIG. 3, GPS processing systems 1 to N correspond to the mixers 54, 56, and 57 and the low-pass filters 58, 60, and 61, whereas GPS processing systems N+1 to N+M correspond to the mixer 55 and the low-pass filter 59.

Thus, the use of the I signal outputted from the quadrature demodulator 24 for normal signal processing and the use of the Q signal as it is as a comparison signal for determining correlation during GPS reception eliminates the need for employing a phase shifter 30 and an adder 31, as in the second embodiment. Therefore, it is possible to simplify circuit configuration and reduce power consumption. In addition, the correlator 32' can be formed by a simple configuration that does not require the multipliers 51 and 52 and the 90° phase shifter 53 of the correlator 32 shown in FIG. 3. Therefore, it is possible to further simplify circuit configuration and further reduce power consumption.

It is to be noted that applications of the foregoing embodiments to a digital portable telephone apparatus have been described as examples; however, the present invention is not limited to this. The present invention is applicable to a portable terminal apparatus in general having a first receiving system for receiving a quadrature modulated signal and a second receiving system comprising at least one system for receiving a BPSK modulated signal.

As described above, when a portable terminal apparatus according to the present invention has a first receiving system for receiving a quadrature modulated signal and a second receiving system comprising at least one system for receiving a BPSK modulated signal, a part of an IF stage circuit is shared for both the receiving systems. This eliminates the need for a complex control system, thereby making it possible to simplify circuit configuration and reduce power consumption.

While a preferred embodiment of the present invention has been described using specific terms, such description is for illustrative purposes only, and it is to be understood that changes and variations may be made without departing from the spirit or scope of the following claims.

What is claimed is:

1. A portable terminal apparatus comprising:
   a first receiving system for receiving a quadrature modulated signal and converting the quadrature modulated signal into an intermediate-frequency signal for output;
   a second receiving system comprising at least one system for receiving a binary phase shift keying modulated signal and converting the binary phase shift keying modulated signal into an intermediate-frequency signal for output;
   an intermediate frequency stage for processing both the intermediate-frequency signal of said first receiving system and the intermediate-frequency signal of said second receiving system; and
   a signal processing system for processing the signal of said first receiving system that has been passed through said intermediate frequency stage and the signal of said second receiving system that has been passed through said intermediate frequency stage,
   wherein said intermediate frequency stage includes a variable gain amplifier for amplifying the intermediate-frequency signal of said first receiving system and the intermediate-frequency signal of said second receiving system and a quadrature demodulator for subjecting the intermediate-frequency signals that have been passed through the variable gain amplifier to quadrature demodulation for output,
   wherein said signal processing system includes a phase shifter that generates an I signal and a Q signal by demodulating the intermediate-frequency signal output from said second receiving system so that said I signal and said Q signal coincide with each other in phase.

2. The portable apparatus as claimed in claim 1, wherein said signal processing system further includes an adder that adds the I signal and the Q signal that have passed through said phase shifter, and a correlator that demodulates said binary phase shift keying modulated signal based on sum of said adder.

3. The portable terminal apparatus as claimed in claim 1, wherein when said intermediate frequency stage has said quadrature demodulator, said signal processing system includes a correlator for demodulating said binary phase shift keying modulated signal on the basis of an I signal or a Q signal of said second receiving system obtained by demodulating the intermediate-frequency signal by said quadrature demodulator.

4. The portable terminal apparatus as claimed in claim 1, wherein when said intermediate frequency stage has said variable gain amplifier and said quadrature demodulator, said portable terminal apparatus includes a control means for fixing gain of said variable gain amplifier at about a maximum gain in demodulating said binary phase shift keying modulated signal.

5. The portable terminal apparatus as claimed in claim 1, wherein when said intermediate frequency stage has said variable gain amplifier and said quadrature demodulator, said portable terminal apparatus includes a control means for controlling gain of said variable gain amplifier to a maximum gain while maintaining linearity on the basis of a demodulated signal obtained by demodulating said binary phase shift keying modulated signal.

6. The portable terminal apparatus as claimed in claim 1, wherein when said intermediate frequency stage has said variable gain amplifier and said quadrature demodulator, said portable terminal apparatus includes a control means for controlling gain of said variable gain amplifier to about a maximum gain even with nonlinearity on the basis of a demodulated signal obtained by demodulating said binary phase shift keying modulated signal.

7. A portable terminal apparatus comprising:
   a first receiving system for receiving a quadrature modulated signal and converting the quadrature modulated signal into an intermediate-frequency signal for output;
   a second receiving system comprising at least one system for receiving a binary phase shift keying modulated signal and converting the binary phase shift keying modulated signal into an intermediate-frequency signal for output;
   an intermediate frequency stage for processing both the intermediate-frequency signal of said first receiving system and the intermediate-frequency signal of said second receiving system; and
   a signal processing system for processing the signal of said first receiving system that has been passed through said intermediate frequency stage and the signal of said second receiving system that has been passed through said intermediate frequency stage,
   wherein when said intermediate frequency stage includes a quadrature demodulator, said signal processing system includes a phase shifter that generates an I signal and a Q signal that coincide with each other in phase.

* * * * *